May 24, 1932.  S. W. McBIRNEY  1,859,783
STALK CUTTING APPARATUS
Filed Dec. 3, 1929
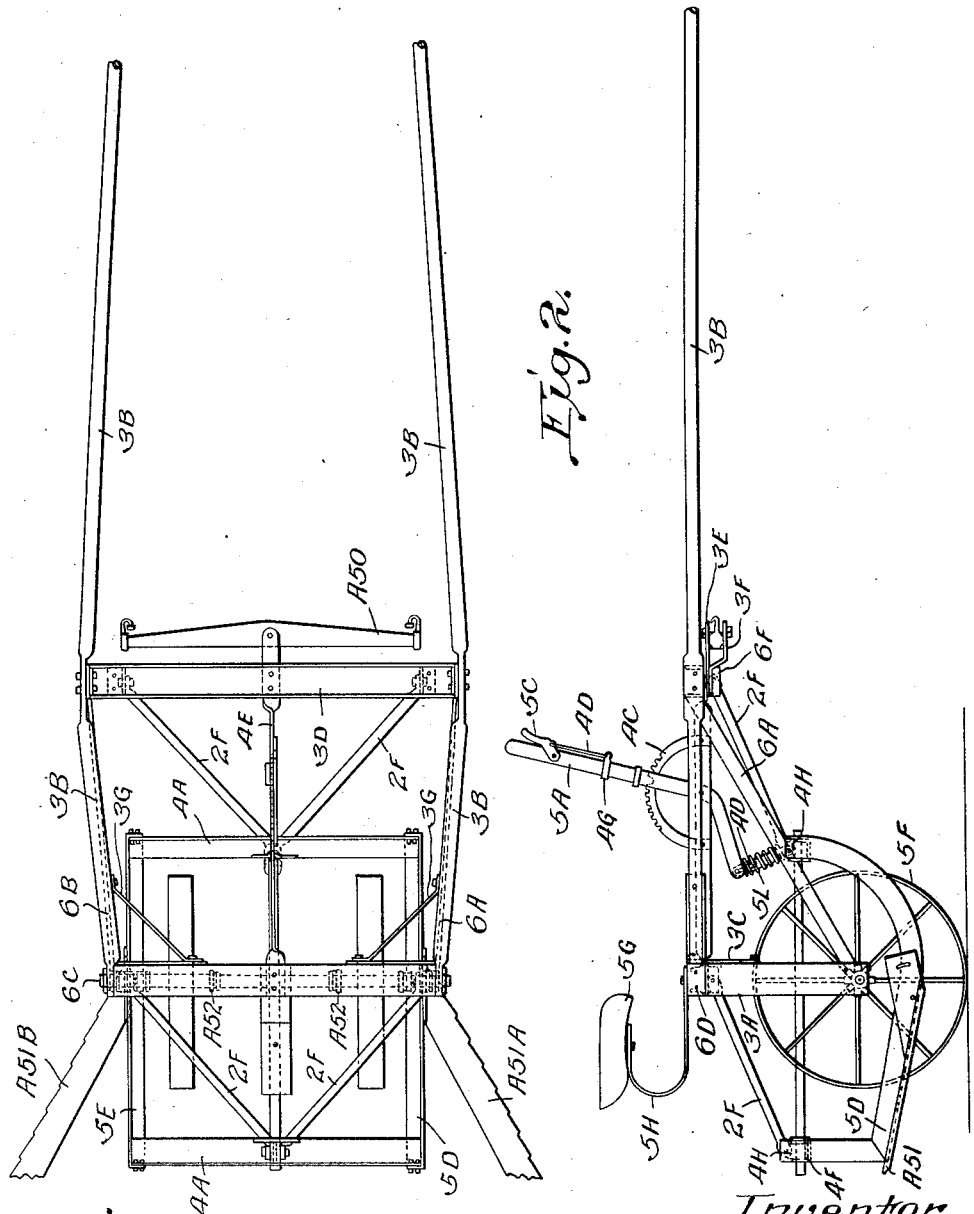

Patented May 24, 1932

1,859,783

UNITED STATES PATENT OFFICE

STANLEY W. McBIRNEY, OF TOLEDO, OHIO; DEDICATED, BY MESNE ASSIGNMENTS, TO THE PEOPLE OF THE UNITED STATES OF AMERICA

STALK CUTTING APPARATUS

Application filed December 3, 1929. Serial No. 411,293.

(GRANTED UNDER THE ACT OF MARCH 3, 1883, AS AMENDED APRIL 30, 1928; 370 O. G. 757)

This application is made under the act approved April 30, 1928, and the invention herein described, may be manufactured and used by or for the Government for governmental purposes without payment to me of any royalty thereon.

The purpose of this machine is to shave or cut off stalks of corn or other similar row crops near (slightly above or below) the ground surface. More specifically its purpose is for shaving off old, dried cornstalks either in the late fall or spring preparatory to raking and burning them, or removing them from the field.

In the control of certain insects such as the European corn borer, one method is the destruction by burning of the cornstalks in which the over-wintering borer larvæ are hibernating. Another method is the utilization of the old stalks for paper pulp, wall board pulp, and other such products. In certain farm practices it is desirable or essential that the old cornstalks either be burned or removed from the field. The first operation in carrying out any of these practices is the severing of the stalks from the ground preparatory to raking. This two-row, one-horse, cart-type stalk shaver is designed to perform this severing operation.

The shaver can also be used for cutting green corn for fodder or ensilage, though an attachment would be necessary if the stalks were to be caught and left in bunches or bundled. By changing the width of the main frame to adapt it to the width of rows, the machine can also be used for shaving off other row crops such as sorghums or soy beans.

Essentially the shaver consists of a two-wheeled cart from the main frame of which is suspended a floating knife frame, pivoted so that it is free to oscillate slightly, which in turn carries two knives, one on either side. The knives are so spaced and their height can be so adjusted that each cuts or shaves off one row of stalks at or near the ground surface.

The same shaving mechanism consisting of knives, floating knife frame pivoted on a central axis, hanger arm suspension and lever adjustment can be used on a shaver of greater capacity such as a three or four-row shaver.

On the accompanying drawings, Fig. 1 is a plan view of the apparatus, with the seat omitted; and Fig. 2 is a side elevation of the complete apparatus.

Referring to drawings, it will be seen that a pair of shafts 3—B bolted to the frame 3—A and the cross member 3—D, together with the side braces 6—A and 6—B, the corner braces 3—G, the frame corner braces 3—C and the lever support 4—E, make up the main frame of the shaver. A pair of wheels 5—F, mounted on axle 6—C, carries the weight of the machine and driver, who rides on the seat 5—G, supported by spring 5—H which is bolted to the frame.

The knife frame made up of the knife runners 5—D and 5—E, and the two cross members 4—A, is pivoted on the longitudinal shaft 4—F, which is suspended from the main frame by the four hanger arms 2—F. The front pair of hanger arms are pivoted to the single tree cross member 3—D by means of brackets 6—F and the rear pair to the channel frame by means of the brackets 6—D. The lower ends of each pair of hanger arms are pivoted to the knife frame shaft by means of the two joints 4—H held in place on the shaft by cotter keys.

The suspension of the knife frame is such that when it is lifted it swings back slightly, the shaft always remaining parallel to the shafts 3—B. The angle between the shaft on which the knife frame is mounted and the bottom of the knife runners is the same as the angle between the shafts when hitched to the sides of the average height horse and the ground surface. The result is that the bottom of the knife runners, as well as the knives A—51 attached to the runners, always remain parallel to the ground surface, regardless of the height at which the knives are set. Extra holes at the rear of the knife runners where they are bolted to the rear cross member of the knife frame provide a means of changing the angle between the knife frame shaft and the bottom of the knife runner when necessary to keep the bottom of the runner parallel with the ground surface if the height of hitch of the shafts is changed as with larger or smaller horses.

The knife frame being pivoted on the shaft is free to oscillate to a certain extent on this shaft. This freedom to swing from side to side allows both knives to remain on the ground and level even though the main frame for a time may not be level crosswise, due to one wheel going over a bump, riding a ridge or following a deep track. This arrangement prevents one blade from digging into the ground excessively while the other is cutting the stalks above the ground surface.

The height at which the knives are set is regulated by the lever assembly 4—D, 4—G, 5—A and 5—C working on segment 4—C, the whole being mounted on the lever supporting member 4—E. The lever is connected to the knife frame by the slotted link 4—D. A compression spring 5—L on this link bears against the lower end of the lever and against the joint on the knife frame shaft, thus holding the blades down firmly against the ground surface, but allowing them to float up or down slightly to allow for uneveness of the ground.

The knives are bent up at an angle at their forward end giving a flat surface to bolt against the side of the knife runner. The front one of the two holes used for bolting the blades to the knife runner is slotted thereby allowing the rear end of the blade to be raised or lowered somewhat to allow for variations in height of hitch of the shafts at the sides of the horse. The bend in the blade is so made that the blade makes a 30-degree angle with the line of travel and the angle between the plane of the face of the blade and the ground level is 11 to 12 degrees. The cutting edge of the blade is beveled on the under side, the beveled surface being horizontal as used in operation. The cutting edge is serrated as shown in the top view of the drawings, though if the shaver were being used on green, succulent stalks a blade with a smooth cutting edge can be used and is nearly as effective as the serrated blade.

I claim:

1. A stalk cutting apparatus comprising a cart, a longitudinal shaft pivotally supported by said cart, a rectangular knife frame pivotally supported on the shaft, whereby the knife frame becomes a floating member, a knife attached to each side of the floating knife frame and having one end extending outwardly from said knife frame and a lever adjustment associated with said knife frame to control the height of the knives from the ground, said apparatus being adapted for operation between two rows of stalks and the cutting of both rows simultaneously.

2. A stalk cutting apparatus comprising a main rectangular frame, an axle attached to said main frame, wheels supporting the axle, shafts attached to said axle and main frame, a longitudinal shaft pivotally supported by said main frame, a rectangular knife frame pivotally supported on the shaft, whereby the knife frame becomes a floating member, a knife attached to each side of said floating knife frame and having one end extending outwardly from said knife frame, and a lever adjustment associated with said knife frame to control the height of the knives from the ground, said apparatus being adapted for operation between two rows of stalks and the cutting of both rows simultaneously.

3. In a stalk cutting apparatus the combination with a cart of a lever controlled suspended pivoted floating knife frame equipped with knives, comprising a longitudinal shaft pivotally supported by the cart, a rectangular knife frame pivotally supported on the shaft whereby the knife frame becomes a floating member, a knife attached to each side of said floating knife frame and having one end extending outwardly from said knife frame and a lever adjustment associated with said knife frame to control the height of the knives from the ground, said apparatus being adapted for operation between two rows of stalks and the cutting of both rows simultaneously.

STANLEY W. McBIRNEY.